United States Patent [19]

Tolley et al.

[11] Patent Number: 4,494,277
[45] Date of Patent: Jan. 22, 1985

[54] CRAB HOLDER FOR PROCESSING MACHINE

[75] Inventors: Calvert B. Tolley; Andrew T. Tolley, both of Wingate, Md.

[73] Assignee: Sea Savory, Inc., Cambridge, Md.

[21] Appl. No.: 431,284

[22] Filed: Sep. 30, 1982

Related U.S. Application Data

[63] Continuation-in-part of Ser. No. 169,150, Jul. 15, 1980, Pat. No. 4,380,094.

[51] Int. Cl.³ ............................................. A22C 29/00
[52] U.S. Cl. ....................................................... 17/71
[58] Field of Search .............. 17/71, 70; 198/654, 198/655, 694, 695, 696

[56] References Cited

U.S. PATENT DOCUMENTS

| 807,541 | 12/1905 | Cunningham et al | 198/695 |
| 2,298,955 | 10/1942 | Mason et al. | 198/654 X |
| 2,571,531 | 10/1951 | Bridge | 198/655 X |
| 3,253,299 | 5/1966 | Harris | 17/71 X |
| 3,330,400 | 7/1967 | Alexander | 198/696 X |
| 4,041,822 | 8/1977 | Gabel | 198/654 X |

Primary Examiner—Willie G. Abercrombie
Attorney, Agent, or Firm—Scrivener, Clarke, Scrivener and Johnson

[57] ABSTRACT

A two-part crab holder is provided with specifically contoured surfaces for supporting a crab through various processing means.

6 Claims, 11 Drawing Figures

U.S. Patent   Jan. 22, 1985   Sheet 1 of 2   4,494,277
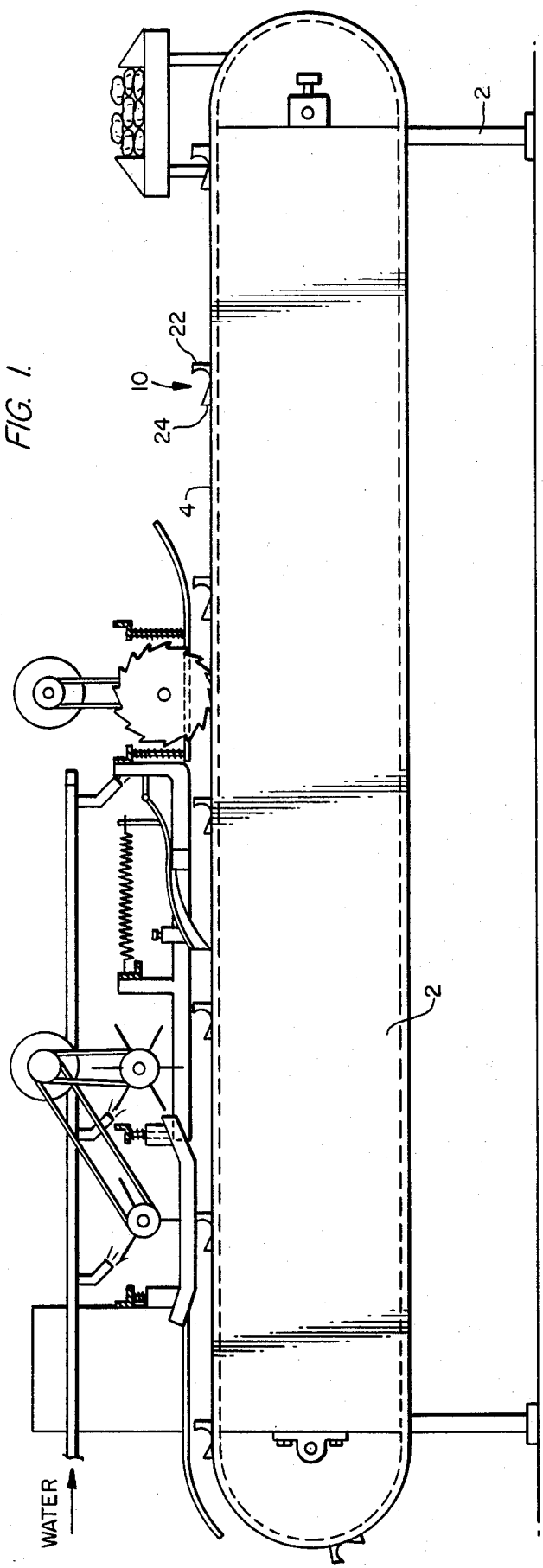
FIG. 1.
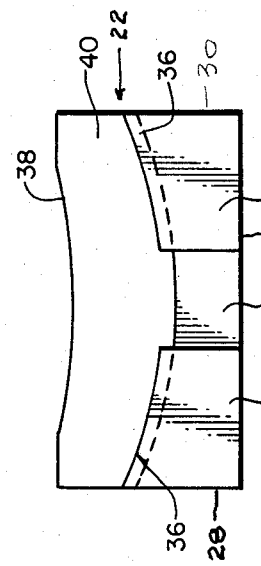
FIG. 3.
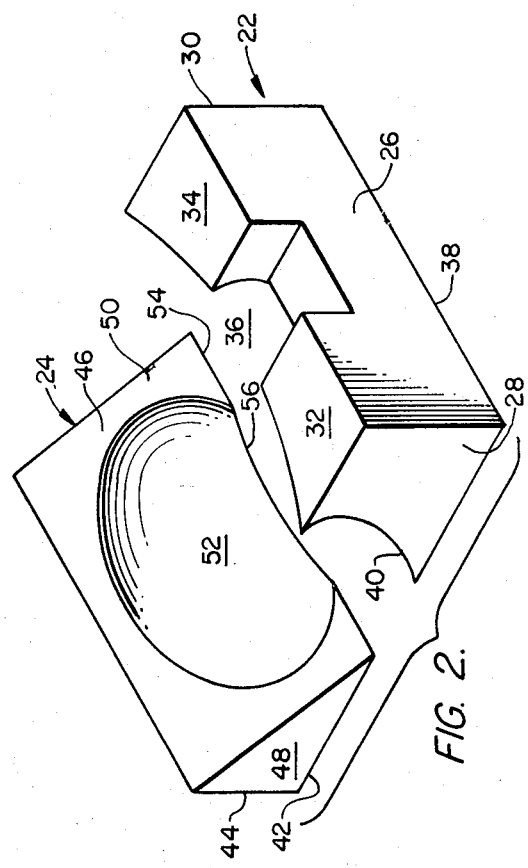
FIG. 4.
FIG. 2.

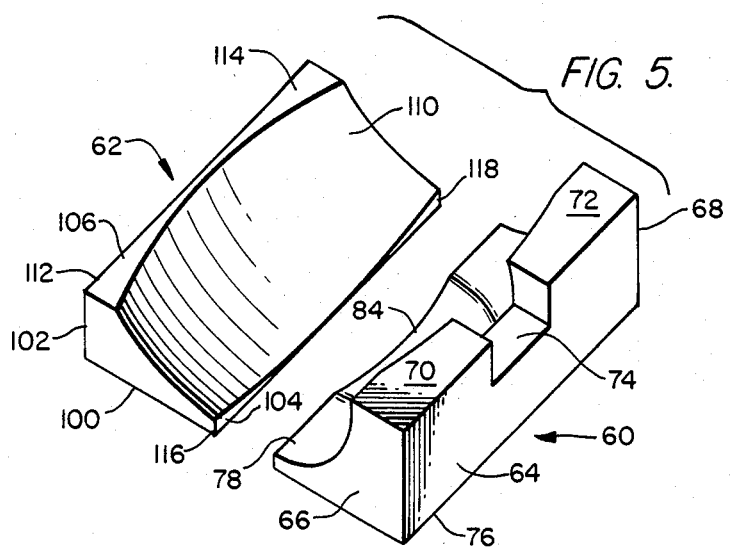
FIG. 5.
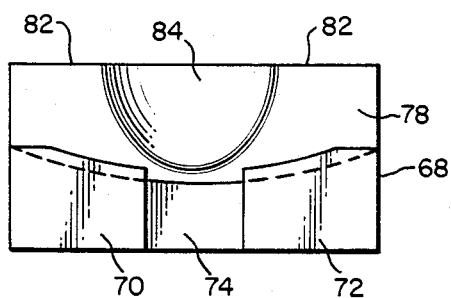
FIG. 6.
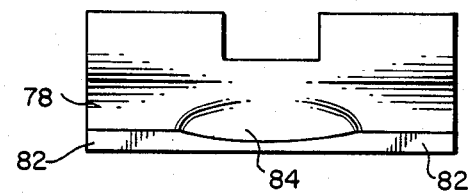
FIG. 7.
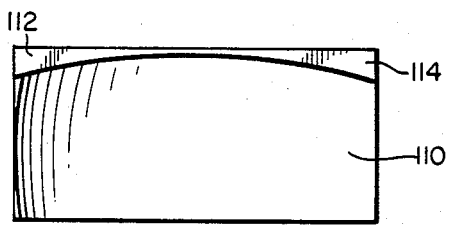
FIG. 8.
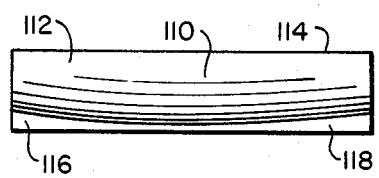
FIG. 9.
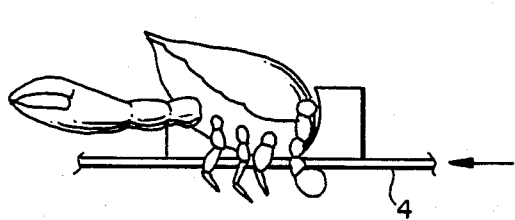
FIG. 10.
FIG. 11.

CRAB HOLDER FOR PROCESSING MACHINE

RELATION TO OTHER CASES

This application is a continuation-in-part of our copending application Ser. No. 169,150 filed July 15, 1980 now U.S. Pat. No. 4,380,094 for Crab Processing Machine.

SUMMARY OF THE INVENTION

A device is provided for holding a cooked crab as it is moved through the work stations of a machine which removes the carapace, claws, flippers and walking legs and cleans the remaining crab body. The holder is specially shaped to receive remaining crab body. The holder is specially shaped to receive and hold the body of each of various species of crabs.

DESCRIPTION OF THE DRAWINGS

FIG. 1 is a side view of a crab processing machine showing the crab holder provided by the invention;

FIG. 2 is a perspective view of the two parts of one embodiment of the crab holder;

FIGS. 3 and 4 are, respectively, top plan views of the two parts of the crab holder shown in FIG. 2;

FIG. 5 is a perspective view of the two parts of a second embodiment of the invention;

FIGS. 6 and 7 are, respectively, top and front views of the upstream part of the holder shown in FIG. 5;

FIGS. 8 and 9 are, respectively, top and front views of the downstream part of the holder shown in FIG. 5, and FIGS. 10 and 11 are, respectively, side and end views of a crab holder showing a crab positioned on the holder for processing by a machine.

DESCRIPTION OF THE INVENTION

A machine utilizing the holders provided by the invention comprises means for individually moving cooked crabs to and through successive work stations at which different operations are performed, resulting in the production of a crab body from which the carapace, claws, walking legs, swimming legs and viscera have been removed and which has been washed and scrubbed, leaving a body from which only the removal of the meat remains to be performed.

The basic parts of the machine are illustrated in FIG. 1 and comprise an elongated supporting frame 2 having a plurality of work stations spaced along its length, an endless chain 4 continuously traveling throughout the length of the frame to successive work stations, and operating means at each work station to perform one or more operations on the crab supported on each holder.

A plurality of crab holders 10 are mounted on the endless chain 4 and are suitably spaced along its length, each crab holder being constructed and intended to support one crab throughout its passage through the successive work stations of the machine.

A preferred form of the holder, which is particularly adapted to hold the Collinectes and similar species of crabs, is disclosed in FIGS. 2, 3 and 4 and comprises an upstream part 22 and a downstream part 24 which may be separately connected in upstream-downstream relation to the chain 4. The part 22 has a flat vertical upright upstream wall 26 which preferably extends laterally beyond the sides of the chain, end walls 28, 30, a flat upper surface comprising parts 32, 34 which are separated by a centrally located open end cut-out part 36, and a flat bottom wall 38 which extends in a downstream direction beyond the downstream edge of the upper wall parts 32, 34, thus forming an inclined downstream facing surface 40. The downstream edges 36 of the upper surfaces and the downstream edge 38 of the bottom are arcuately and concavely curved about an arc the center of which is downstream, and these two edges are connected by the inclined downstream facing surface 40 which is concavely curved transversely and also concavely curved between the upper surface and the bottom.

The downstream part 24 of the holder is right-triangular in upstream-downstream section, having flat bottom 42, flat wall 44 at the downstream end of the bottom wall, an inclined generally flat surface 46 which faces upstream opposite the compound curved wall 40 of part 22, and side walls 48, 50 which are aligned with side walls 28, 30 of the upstream holder part 22. The inclined surface 46 has formed in it a generally oval depression 52 which is centrally located in surface 46, and this depression intersects the upstream edge 54 of bottom 42, thereby producing at and adjacent the center of edge 54 an inwardly arcuately edge 56 which faces the arcuately concavely curved downstream facing edge 38 of the bottom of part 22.

A second form which the crab holder according to the invention may take is disclosed in FIGS. 5 to 9 of the drawings, in which FIGS. 6 and 7 illustrate the upstream part and FIGS. 8 and 9 illustrate the downstream part of the holder. This holder is found to be particularly useful in holding the Cancer i.e. the Rock, Sand and Jonah crabs, and with the same shape but larger in size is particularly useful in holding the Dunganess (Cancer Magester) crab as well as the Stone crab (Menippe Merceneria) and other crustanceans too numerous to mention.

This second form of the invention comprises an upstream part 60 and a downstream part 62 which are separately connected in upstream-downstream relation to the chain 4. The part 60 has a flat vertical upright upstream wall 64 which preferably extends laterally beyond the sides of the chain, end walls 66, 68, a flat upper surface comprising parts 70, 72 which are separated by a centrally located open end cut-out part 74, and a flat bottom wall 76 which extends in a downstream direction beyond the downstream edge of the upper wall parts 70, 72 thus forming an inclined downstream facing surface 78. The downstream edges of the upper surface 70, 72 are arcuately and concavely curved on their downstream facing edges about an arc the center of which is downstream, and these two edges are connected by the inclined downstream facing surface 78 which is not only concavely curved transversely but is also concavely curved between the upper surface and the bottom, and terminates at a level above the bottom, thereby forming a downstream facing wall 82 of low height extending upwardly from the bottom and forming a downstream facing edge at the bottom of this part. The inclined surface 78 has formed in it a generally oval depression 84 which is centrally located in the surface, and this depression intersects the edge wall 82 as most clearly shown in FIG. 7.

The downstream part of this form of the invention is of generally right triangular shape in the upstream-downstream direction, having a flat bottom 100, a flat wall 102 at the downstream edge of the bottom, a flat wall 104 at the upstream edge of the bottom, and an upper surface 106 which is parallel to the bottom and extends upstream from the upper end of downstream wall 102, and which is very short in the upstream direction. Almost the entire upstream facing surface 110 is formed as an oval depression which is located centrally of the surface, leaving only corners 112, 114 at its upper edge as remnants of the upper surface 106 and corners 116, 118 as remnants of the upstream facing wall 104.

The relations and sizes of the two crab holder parts, and the configuration of their facing crab body supporting surfaces are such that a holder provided by the invention will receive any of a large number of species of crabs with the upper surface of the two parts of the holder closely conforming to the lower surface of the body of the crab.

In order to permit proper and intended operation of the machine apparatus at the successive work stations each crab is placed in the holder with the carapace facing upwardly as shown in FIG. 10, and with the flippers, legs and claws outside the side walls of the two parts of the holder as shown in FIG. 11. It will be understood that the parts of the crab holder will be made of such size that any legal size crab, including those referred to above, will be received and held in this relation of parts.

The crab holders provided by our invention may be made as two separate parts which will be separately connected to the endless chain by which the holders and crabs are moved through the machine. However, the holders may be made as one unitary member formed by uniting the two parts described in this specification, within the scope of the claims.

We claim:

1. As a new article of manufacture, a two-part holder for supporting a crab in its upstream-downstream movement through the successive work stations of a crab processing machine, comprising:
   (a) a first holder part adapted to be in the upstream position in use, having a flat bottom surface, a flat upstream wall at a right angle to the bottom surface, a flat upper surface parallel to the bottom surface and extending downstream a distance shorter than that of the bottom surface, thus forming an upstanding part extending transversely of the holder part which is divided into equal parts by a central opening extending in the upstream-downstream direction, and an inclined downstream facing surface connecting the downstream edges of the upper surface and the bottom, which is concave both transversely and in the upstream direction, and
   (b) a second holder part adapted to be in the downstream position in use, having a flat bottom surface, a flat downstream located wall, and an inclined upstream facing surface at least the central part of which has a depression in it,
   the two holder parts being adapted to be placed in close upstream-downstream proximity to form a single support for the body of a crab with the carapace positioned upwardly.

2. A crab supporting holder according to claim 1, in which the inclined surface of the down stream part has a centrally located depression therein.

3. The crab holder according to claim 2, in which the depression intersects the upstream edge of the bottom whereby the central part of the edge is arcuately curved inwardly of the part.

4. A crab supporting holder according to claim 1, in which the upstream part has a vertical wall of low height extending upwardly from the downstream edge of the bottom, and the inclined arcuately curved surface of this part has a centrally located oval depression in it which intersects the said vertical wall.

5. A crab supporting holder according to claim 1, in which downstream part has an upper surface extending upstream from the upper edge of the downstream wall, and the depression in the inclined surface intersects the upper surface.

6. The crab supporting holder according to claim 5, in which the inclined surface is arcuately concave transversely of the holder and also in the upstream-downstream direction.

* * * * *